United States Patent [19]
Bonitz

[11] Patent Number: 5,855,439
[45] Date of Patent: Jan. 5, 1999

[54] BEARING CHAIN

[76] Inventor: Nikolaus Bonitz, 4 Balmoral Place, Apartment 304, Brockville, Ontario, Canada, K6V 6K1

[21] Appl. No.: 865,720

[22] Filed: May 30, 1997

[51] Int. Cl.$^6$ .................................................... F16C 33/40
[52] U.S. Cl. ............................................................. 384/614
[58] Field of Search ................................... 384/614, 613, 384/622, 531, 532

[56] References Cited

U.S. PATENT DOCUMENTS 3,982,800  9/1976  Gorton et al. ........................... 312/305
4,632,474  12/1986  Ingersoll ................................. 312/305

FOREIGN PATENT DOCUMENTS 170667  7/1916  Canada .
203964  9/1920  Canada .
1000659  9/1973  Canada .
1141709  2/1983  Canada .

*Primary Examiner*—Lenard A. Footland
*Attorney, Agent, or Firm*—Gowling, Strathy & Henderson

[57] ABSTRACT

A bearing unit is provided with casters on either side reducing frictional losses during travel in a channel. The bearing unit is capable of being hingedly connected to other similar bearing units, end to end, to form a bearing chain. Such a chain is capable of assuming a multitude of shapes and, therefore, can adapt to the shape of a non-linear channel. This device is particularly useful as a means of reducing frictional energy losses when one solid surface is required to slide over another solid surface in a curvilinear path.

3 Claims, 2 Drawing Sheets

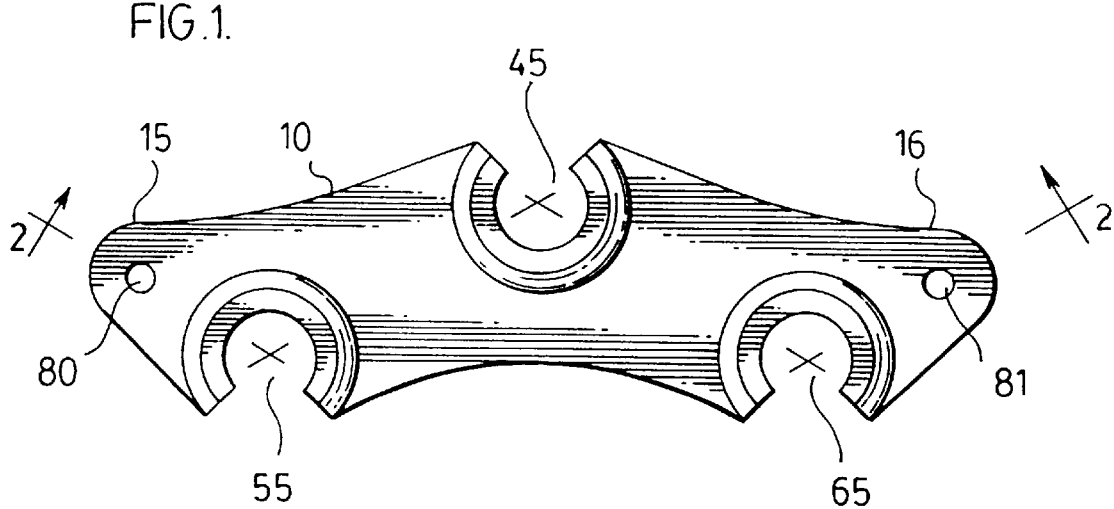
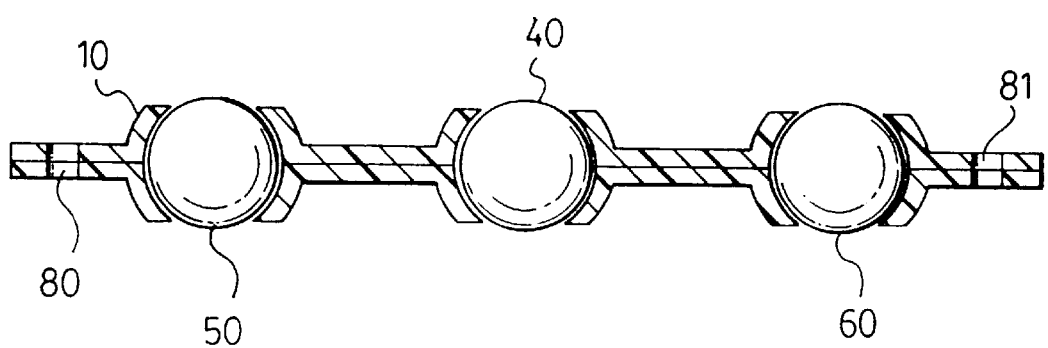

FIG. 3.
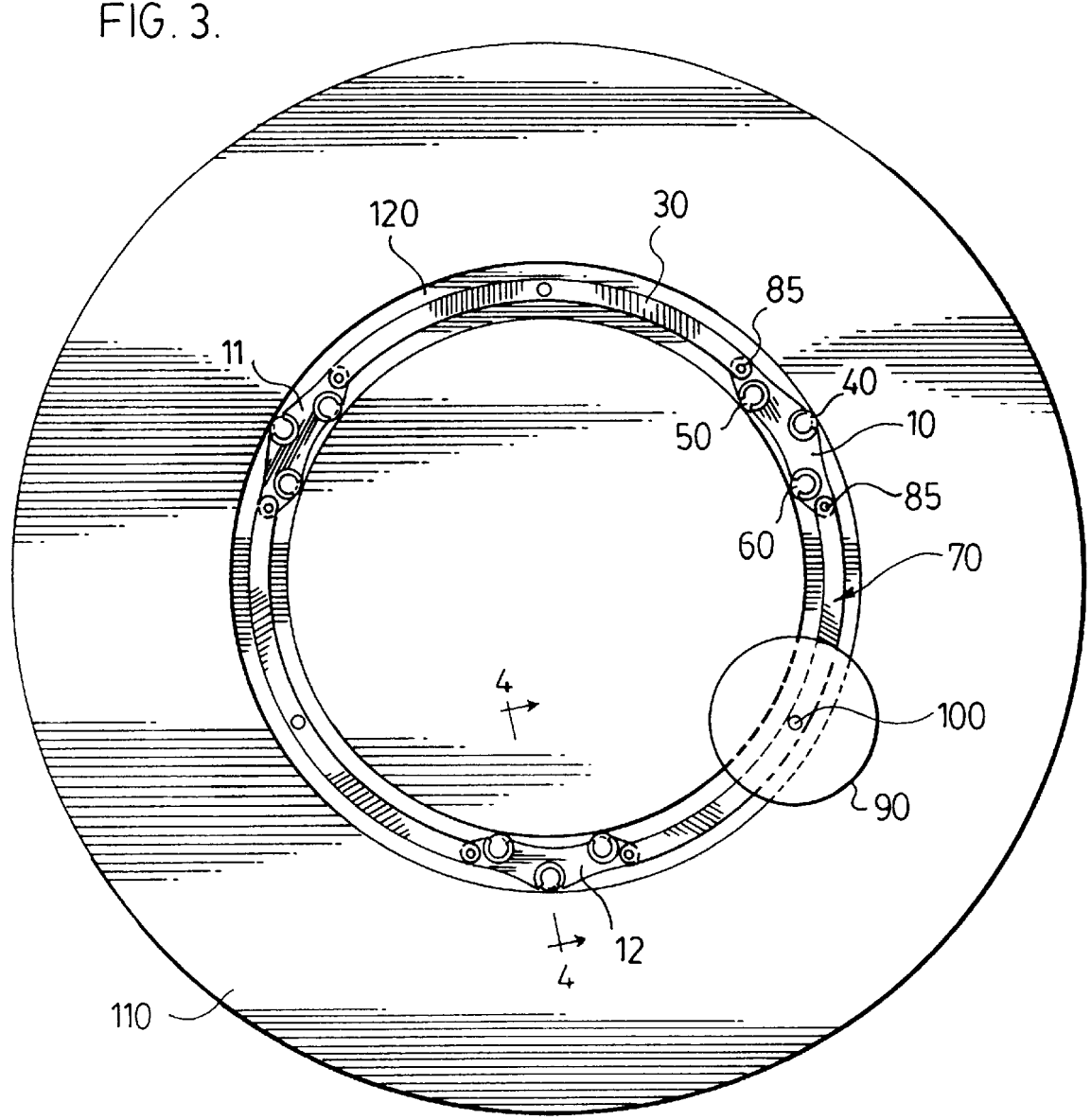
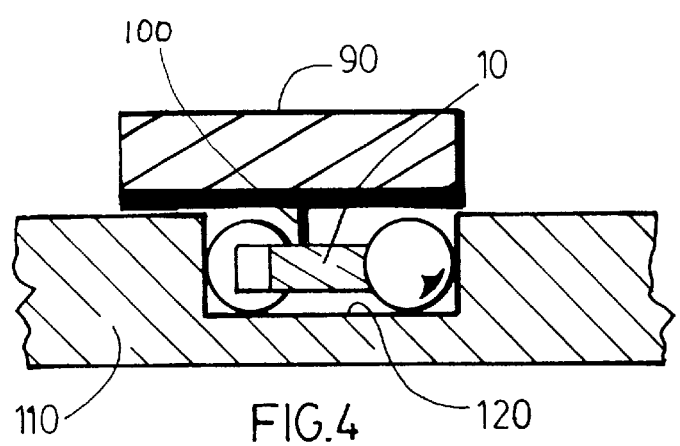
FIG. 4

BEARING CHAIN

FIELD OF INVENTION

The present invention relates to the field of bearings and other devices which reduce frictional energy losses arising from mechanically movement of materials against one another.

BACKGROUND OF THE INVENTION

Bearings have been used extensively to reduce frictional energy losses occurring when two solid surfaces slide over one another. In many instances, they are used to accommodate rotational movement of one surface over another.

In some instances, two surfaces may be required to slide over one another in a linear or curvilinear path. Accordingly, there is a need for a bearing device to reduce frictional losses arising from sliding one surface over another in a curvilinear path.

SUMMARY OF THE INVENTION

One embodiment of the present invention provides a bearing chain, consisting of individual bearing units that are hingedly connected to each other, is capable of assuming a multitude of shapes allowing, for example, travel of the chain in a curvilinear channel.

According to one aspect of the present invention, there is provided a bearing unit consisting of an elongated rigid body supported on casters, where such casters are loosely held within sockets formed along the periphery of the rigid body.

According to another aspect of the present invention, there is provided a bearing unit consisting of an elongated rigid body supported on casters, where such casters are loosely held within sockets formed along the periphery of the rigid body, and where the bearing unit is capable of being hingedly connected to other similar bearings to form a chain.

According to another aspect of the present invention, there is provided a bearing chain consisting of several bearing units, each of the individual bearing units consisting of an elongated rigid body supported on casters, where such casters are loosely hold within sockets formed along the periphery of the rigid body, and where each of the individual bearing units are connected end to end.

BRIEF DESCRIPTION OF DRAWINGS

The invention will be better understood when consideration is given to the following detailed description thereof. Such description makes reference to the annexed drawings wherein:

FIG. 1 is a top view of a bearing unit of the present invention without casters.

FIG. 2 is a side view of the bearing device in FIG. 1 with casters.

FIG. 3 is a top view of one embodiment of a bearing chain of the present invention.

FIG. 4 is a section view, taken along line 4—4 of FIG. 3.

DESCRIPTION OF PREFERRED EMBODIMENT

Referring now to FIGS. 1, 2 and 3, according to one embodiment of the invention, the bearing chain consists of bearing devices 10, 11 and 12 hingedly connected to one another with a connecting link 70, to form a bearing chain 30. Each of the bearing devices 10, 11 and 12 are the same.

FIG. 3 depicts a bearing chain 30 where each of the bearing devices 10, 11 and 12 are connected end to end so that the bearing 30 appears circular in shape from a top view. FIG. 3 is not intended to limit the scope of the invention. For instance, it is not essential that the bearing chain 30 appear circular in shape from a top view. Further, it is not essential that each of the bearing devices 10, 11 and 12 be connected end to end so that the bearing chain 30 is closed. Neither is it essential that the bearing units be oriented in the same direction or in the same way.

FIG. 1 depicts the top view of the bearing device 10 without the associated casters 40, 50 and 60. The bearing device 10 is shown to have three sockets 45, 55, and 65 which are intended to receive the three casters 40, 50 and 60. The three casters 40, 50 and 60 are held integral to the bearing device 10 and held loosely by each of the associated sockets 45, 55 and 65.

The bearing device 10 has two ends 15 and 16. Each end 15 and 16 may be hingedly connected to one end of another bearing device 11 or 12 with a connecting link 70. FIGS. 1 and 2 show a bearing device 10 with two holes 80 and 81 which are designed to receive dowel pins 86 and 86 to permit connection to the connecting link 70.

The connecting link 70 is fixedly connected to the slidable surface 90 by a pivot 100, thereby permitting such surface to slide over the second surface 110 with fewer friction losses by virtue of the first surface's 90 connection to the bearing chain 30 which travels through a channel 120 imbedded in the second surface 110.

While one embodiment of the present invention has been described, it is understood that the invention is not limited in its application to these details. It will be readily understood by those skilled in the art that the invention is capable of other embodiments and of being practised and carried out in various ways.

I claim:

1. A bearing device, comprising:
   a minimum three casters;
   a rigid body having a length, width, two ends and thickness;
   said rigid body to include sockets on the periphery of said rigid body to receive said casters, such that the diameter of said casters is greater than the thickness of said body and a portion of each of said casters extends beyond the perimeter of said body, two of said at least three casters located on the same side of said body.

2. The bearing device in claim 1, wherein said rigid body is made of plastic.

3. The bearing device in claim 1, wherein said bearing device is pivotably coupled at one end thereof to one end of a second such bearing device.

* * * * *